A. PETERSON,

Assignor of one-half to S. C. CROFT.

Carpet Exhibitor.

No. 9,522. Reissued Dec. 28, 1880.

*Witnesses:*

Isaac Samuels

William H. Lewis

*Inventor*

Adolphus Peterson per Charles T. Mash atty.

N. PETERS, PHOTO-LITHOGRAPHER, WASHINGTON, D. C.

UNITED STATES PATENT OFFICE.

ADOLPHUS PETERSON, OF NEW YORK, N. Y., ASSIGNOR OF ONE-HALF TO SILAS C. CROFT.

CARPET-EXHIBITOR.

SPECIFICATION forming part of Reissued Letters Patent No. 9,522, dated December 28, 1880.

Original No. 222,730, dated December 16, 1879. Application for reissue filed November 18, 1880.

*To all whom it may concern:*

Be it known that I, ADOLPHUS PETERSON, a citizen of the United States, residing in the city, county, and State of New York, have invented certain new and useful Improvements in Carpet-Exhibitors, of which the following is a full, clear, and exact description, which will enable others skilled in the art to make and use the same, reference being had to the accompanying drawings, forming a part of this specification, in which—

Figure 1:
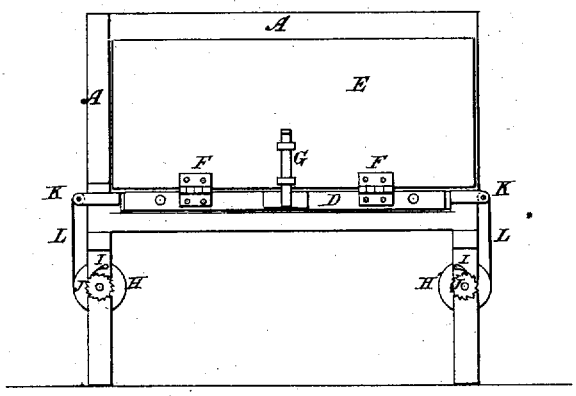
Figure 2:
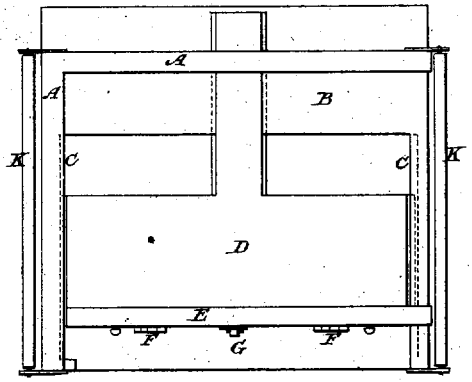
Figure 3:
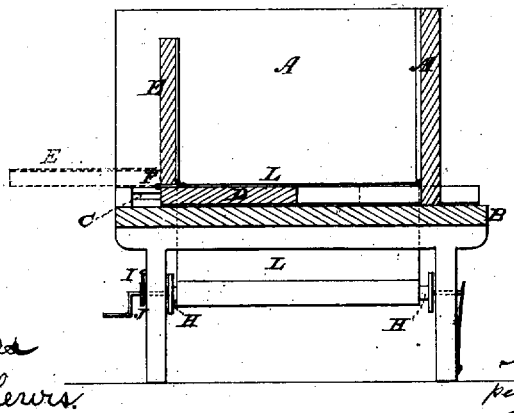

Figure 1 represents a side elevation. Fig. 2 is a plan of the same. Fig. 3 is a sectional end elevation.

Similar letters of reference indicate corresponding parts.

Heretofore mirrors have been used in vertical position, with their reflecting-faces inward, forming a square or parallelogram, so as to surround a sample of carpet or other article which is placed within the square of their planes, or upon which the said mirrors may be set, and thereby multiply such pattern indefinitely; but all such devices have been inconvenient to manipulate, the samples being used in separate pieces, the mirrors detached from each other, as well as being independent from the table on which the samples are laid one after another for exhibition.

The object of my invention is to obviate the necessity of handling a number of separate samples in connection with detached mirrors; and it consists in combining the mirrors in use with a roll or strip of connected samples passing from one roller to another over the table and under the base of surrounding mirrors, and also in having one or more of the mirrors arranged so that the same may be adjusted to the different sizes of samples being exhibited.

The various samples or patterns of different sizes in my improved device have their ends connected so as to form a single strip or roll to be wound on rollers which serve to draw the samples smoothly and rapidly across the plane of the table, with their edges under the surrounding mirrors, so that they may be conveniently exhibited to a purchaser correctly matched out by the reflections or multiplications of the pattern produced by the mirrors.

In the construction shown in the drawings one of the mirrors is hinged to a sliding leaf, so that it may be adjusted to any size of sample, and adapted to be folded back, if desired.

The advantage gained in having one of the mirrors hinged to a sliding leaf is the facility with which it may be laid flat, if desired, while the patterns are being run across the table with a full unobstructed light upon them. The extension-leaf may have one or more dovetailed tongues, which extend through corresponding mortises in the main frame, for the purpose of keeping the movement of the sliding mirror parallel to the opposite one.

The sliding mirror above referred to is capable of being set and held in fixed position, when it is moved inward, until the inner face of the slide D comes in contact with the corresponding face of the table B, and there held locked in such position by the sinking of the bolt G into the table; or, if desired, the said sliding mirror may be held locked at any distance from the back mirror by dropping the aforesaid bolt down on the table; but the main result is obtained when the surrounding mirrors are used in combination with a table over which the samples pass in a connected strip from one roller to another.

In the case here presented A A represent a rigid rectangular mirror rigidly attached to the table B, the said table being provided with ways C C, or their equivalent, for the purpose of receiving and holding an extension or sliding leaf, D, on whose outer side the mirror E is hinged, as shown at F, the said mirror being held in vertical position, when desired, by means of a sliding bolt, G, as shown in Figs. 1 and 2.

Between each pair of the table-legs, or between suitable brackets attached thereto, the rollers H H′ have their bearings. Upon these rollers the strip of samples of carpets or other goods L is wound, so that the strip being rolled off one may be wound on the other, and thereby keep the samples tight and smooth on the plane of the table.

I I are pawls which engage the teeth of the ratchet-wheels J J, and serve to hold the rolls from slipping back.

K K are friction-rollers, extending the full width of the table, which serve to assist in the easy passage of the strip of samples across the table.

Having thus described my invention, what I claim as new, and desire to secure by Letters Patent, is—

1. The combination, in a sample-exhibitor, of the rigid rectangular mirror A A, table B, and ways C C with the sliding extension-leaf D and horizontally-hinged mirror E, for the use and purpose substantially as shown and described.

2. In a sample-exhibitor or pattern-multiplier, the table B and rollers H H′, to which rollers is attached the strip L, in combination with surrounding mirrors, substantially as and for the purpose shown and described.

3. The combination, in a sample-exhibitor, of the adjustable sliding mirror E and fixed rectangular mirror A A with the rollers H H′ and friction-rollers K K, all arranged and operating together in the manner and for the use and purpose specified.

ADOLPHUS PETERSON.

Witnesses:

JAMES H. HUNTER,

E. S. MAILLER.